No. 649,235. Patented May 8, 1900.
J. A. COLLINS.
TROLLEY WHEEL.
(Application filed Apr. 3, 1899.)
(No Model.) 2 Sheets—Sheet 1.
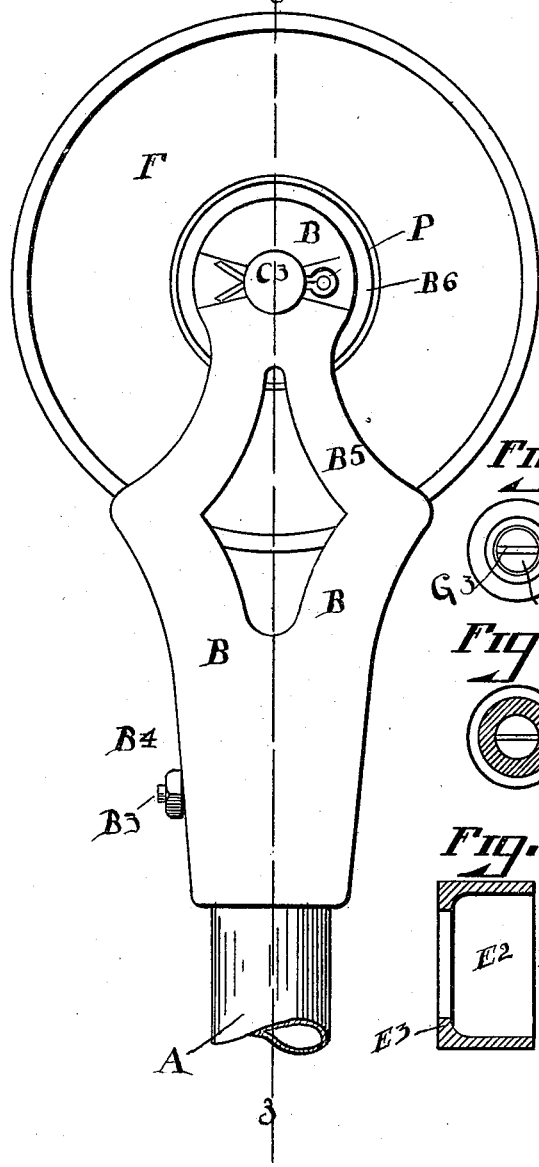
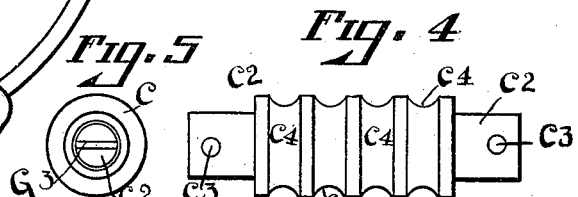
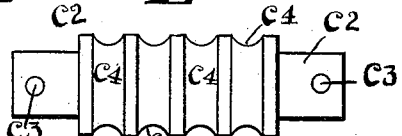
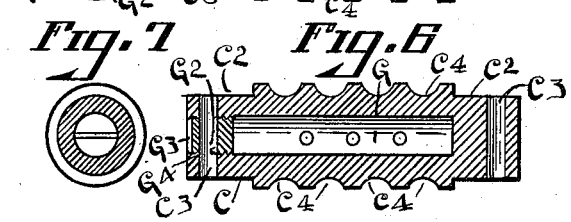
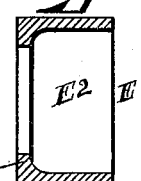
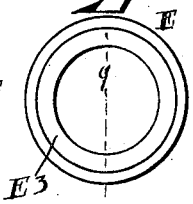
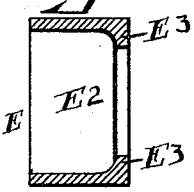
Witnesses
William W Rather
K. Smith
Inventor
James A. Collins

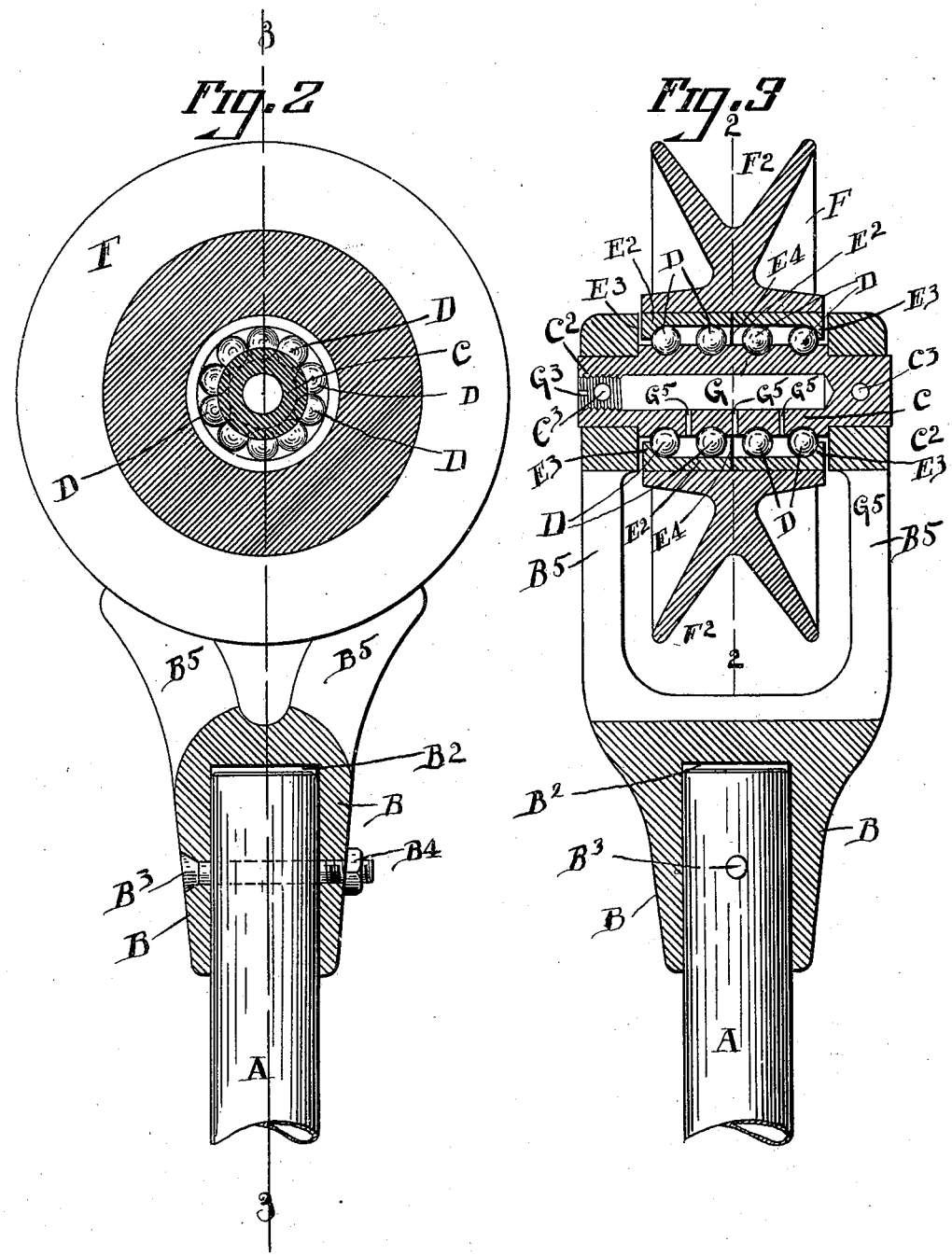

UNITED STATES PATENT OFFICE.

JAMES A. COLLINS, OF CINCINNATI, OHIO.

TROLLEY-WHEEL.

SPECIFICATION forming part of Letters Patent No. 649,235, dated May 8, 1900.

Application filed April 3, 1899. Serial No. 711,576. (No model.)

*To all whom it may concern:*

Be it known that I, JAMES A. COLLINS, a citizen of the United States, and a resident of the city of Cincinnati, in the county of Hamilton and State of Ohio, have invented certain new and useful Improvements in Trolley-Wheels, of which the following is a specification.

Among the various objects attained by the use of my invention may be mentioned the following: ease and facility of movement, avoidance of much friction, durability, comparative simplicity of construction, economy of construction and in repair, economy in use, and efficiency in operation.

The several features of my invention and the various advantages resulting from their use conjointly or otherwise will be apparent from the following description and claims.

In the accompanying drawings, making a part of this application, and in which similar letters of reference indicate corresponding parts, Figure 1, Sheet 1, represents a side elevation of a trolley-wheel illustrating my invention. Fig. 2, Sheet 2, represents a vertical section of the wheel and its immediate support, this section being taken in the plane of the dotted line 2 2 of Fig. 3, the trolley-pole being left in elevation. Fig. 3, Sheet 2, represents a vertical section of the trolley-wheel and its immediate support. This section is taken in the plane of the dotted line 3 3 of Fig. 1 or of Fig. 2. The trolley-pole is left in elevation. Fig. 4, Sheet 1, is a side elevation of the axle (bearing) around which the balls turn. Fig. 5, Sheet 1, is an end elevation of that end of this axle which is at the left hand in Fig. 3. Fig. 6, Sheet 1, represents a horizontal longitudinal central section of this axle. That section is seen which faces upward. Fig. 7, Sheet 1, represents a vertical transverse section taken in the plane of the dotted line 7 7 of Fig. 6 or through the axle similarly at the lowest part of any one of the grooves. Fig. 8, Sheet 1, is an elevation of either end of the conjoint sleeve. Fig. 9, Sheet 1, is a vertical central section of one half of the sleeve. Fig. 10 represents a vertical central section of the opposite half of this sleeve. These sections shown in Figs. 9 and 10 are taken in the plane of the dotted line 9 9 of Fig. 8.

I will now proceed to describe my invention.

The trolley-pole A is of any suitable shape and length and is connected in any well-known or desirable manner to the vehicle. In the present illustrative instance the pole is tubular and of metal. A support for the wheel-bearings is present and is supported by the trolley-pole. The mode of connecting these parts together is common and well known and briefly is as follows: The lower end of the support B has a recess $B^2$. Into this the upper end of the trolley-pole is inserted and is secured therein by a bolt $B^3$, passed through the support and the pole and held in place by a nut $B^4$.

I provide an axle C, whose general shape may be termed "cylindrical." This axle has ends $C^2 C^2$, which are respectively received into openings in the arms $B^5$ of the yoke B. Pins P are passed through holes in the yoke-arms and corresponding holes $C^3$ of the yoke and prevent the axle from rotating. These pins are preferably split keys, as indicated in Fig. 1, and are well known in the art. The main portion of the axle has a series of parallel annular grooves $C^4$ extending around its periphery and adapted to receive the balls D, the latter preferably of steel. These balls D are contained within the conjoint sleeve E, made in two parts or half portions $E^2 E^2$, so as to be readily separated at $E^4$ to enable the balls to be the more readily placed in position on the axle and with that portion of the sleeve within which they are to rotate. The end portions of the sleeve have a flange $E^3$ projecting toward the axial center of the sleeve and adapted to retain the sleeve in position on the balls. The sleeve fits tightly within the trolley-wheel F—that is to say, the latter closely embraces it—and the wheel F and the sleeve turn together as one. The wheel has the customary peripheral groove $F^2$ for the reception of the trolley-wire.

An important feature of my invention consists in the novel provisions for lubricating the balls and the inner surface of the sleeve. The central portion of the cylinder is converted into a chamber G, whose end is closed by a plug (preferably a screw-plug) $G^2$. This plug is provided with means for turning it, and in the present illustrative instance these means consist of the recess $G^3$ for the insertion of a screw-driver. Provision is made for the insertion of the pin P through the hole C³ by providing the stopple G² with a similar hole G⁴, arranged when the stopple is screwed to place to aline with the hole C³. From the chamber G conduits G⁵ extend outward to the peripheral surface of the cylinder C, and these conduits each terminate at their outer end, preferably on a peripheral ridge between the adjacent groove, and consequently between adjacent rows of balls, as shown. The chamber G is duly filled with lubricating substance. This is preferably a viscous or thick oil of the nature of a dope. The rapid revolution of the trolley-wheel as it passes along its wire causes its bearings to become warm, and such increase of heat softens the dope, and it gradually and steadily passes down through the conduits and out and, spreading out, comes in contact with the balls and other bearing-surfaces, and thus lubricates the entire bearing. All portions of these bearings therefore operate with comparatively little friction, and the trolley-wheel revolves easily and the life of the bearings is greatly prolonged.

The electric circuit is maintained by passing from the trolley-wire (on which the wheel runs) to the trolley-wheel F, thence through the sleeve E and the balls D to the axle C, and through the latter to the yoke B. Thence it is duly conveyed to the motor, whereby the vehicle is moved. One mode is by the well-known means of a wire. In the present illustrative instance the trolley-pole A, being metallic, serves as a conductor of the electric current from the yoke B to the electric connections leading to the motor. In case of two trolley-wires being in use (as in a complete metallic circuit) the current through one will be in the reverse direction of that just described.

What I claim as new and of my invention, and desire to secure by Letters Patent, is—

1. The combination of the yoke, an axle, supported at its ends thereby, and provided with annular grooves whose sides and bottoms and the axle itself are in one piece, balls in the grooves, a sleeve inclosing the axle and balls and a trolley-wheel fixed on the sleeve, substantially as and for the purposes set forth.

2. The combination of the yoke, an axle supported fixedly at its ends, and provided with annular grooves, balls in these grooves, a sleeve E made in two sections, a flange at the outer end of each section, the balls being held between the axle and the sleeve, and the trolley-wheel, fixed on the sleeve, substantially as and for the purposes specified.

3. The combination of the yoke, an axle fixed at its ends thereto, and provided with circumferential grooves, balls held therein, by means substantially as described, a trolley-wheel, the axle provided with chamber G and with conduit thence to the periphery, and means for closing the chamber, substantially as and for the purposes specified.

4. The combination of the yoke, an axle fixed at its ends thereto, and provided with circumferential grooves, balls held therein, a bearing resting on the balls, a trolley-wheel, the axle provided with chamber G, and with conduits extending thence to the peripheral ridges between the grooves and means for closing the chamber, substantially as and for the purposes specified.

5. The combination of the yoke, an axle fixed at its ends thereto, and provided with circumferential grooves, balls therein, a divided sleeve having at each outer end a flange, the sleeve and flange bearing on the balls D, a trolley-wheel fixed on the sleeve, the axle provided with the chamber G, and with conduits therefrom to the peripheral ridges between the grooves, and a screw plug or stopple of the chamber, for closing the latter, substantially as and for the purposes specified.

JAMES A. COLLINS.

Attest:
WILLIAM W. PRATHER,
K. SMITH.